(12) United States Patent
Oki

(10) Patent No.: US 7,384,205 B2
(45) Date of Patent: Jun. 10, 2008

(54) PRINT CONTROL APPARATUS AND PRINT CONTROL METHOD

(75) Inventor: Joji Oki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 11/000,190

(22) Filed: Dec. 1, 2004

(65) Prior Publication Data
US 2005/0122535 A1 Jun. 9, 2005

(30) Foreign Application Priority Data
Dec. 8, 2003 (JP) ............................. 2003-409650

(51) Int. Cl.
*B41J 5/30* (2006.01)
(52) U.S. Cl. .................. 400/76; 347/6; 347/7; 399/82; 399/85
(58) Field of Classification Search .................... 347/5, 347/6, 7, 115; 358/1.1, 1.15; 399/79, 82, 399/85; 400/61, 70, 76
See application file for complete search history.

(56) References Cited

U.S. PATENT DOCUMENTS

| 5,604,598 | A | 2/1997 | Shigemura .................. 358/296 |
| 5,835,122 | A | 11/1998 | Oki et al. |
| 6,120,197 | A | 9/2000 | Kawamoto et al. ........... 400/61 |
| 6,498,910 | B2 | 12/2002 | Haneda |
| 6,934,046 | B1 * | 8/2005 | Nishikawa et al. ......... 358/1.15 |
| 7,061,632 | B1 * | 6/2006 | Livingston .................. 358/1.15 |
| 7,145,668 | B2 * | 12/2006 | Shishido ....................... 358/1.1 |
| 7,154,627 | B2 * | 12/2006 | Nishikawa et al. ......... 358/1.15 |
| 7,164,873 | B2 * | 1/2007 | Yamamoto et al. ........... 399/82 |
| 2001/0028805 | A1 | 10/2001 | Haneda |
| 2003/0081265 | A1 | 5/2003 | Watanabe .................... 358/474 |

FOREIGN PATENT DOCUMENTS

| EP | 0 858 211 | 8/1998 |
| JP | 4-204871 | 7/1992 |
| JP | 10-044472 | 2/1998 |
| JP | 2001-71539 | 3/2001 |
| JP | 2001-318499 | 11/2001 |
| JP | 2003-251862 | 9/2003 |

OTHER PUBLICATIONS

May 26, 2006 European Search Report in European Patent Appln. 04 25 7490.

* cited by examiner

*Primary Examiner*—Daniel J. Colilla
*Assistant Examiner*—Kevin D Williams
(74) *Attorney, Agent, or Firm*—Fitzpatrick, Cella, Harper & Scinto

(57) ABSTRACT

The present invention operates in a printing apparatus capable of carrying out printing by switching between a mode using a set of toners for four colors Y, M, C, and K and a mode using a set of toners for six colors including the four primary colors, light cyan, and light magenta. Specifically, when a page layout included in "Page Layout" set items is set for N (N>1) sheet/page, printing is determined to be carried out in the 4 color mode to set a print specification in a job ticket for the 4 color mode. If a plurality of page units are printed within one page, each page unit is contracted when printed. Accordingly, it is often difficult to perceive printed image quality when observing the image. Thus, even if the 6 color mode is set, printing is controlled to be carried out in the 4 color mode.

5 Claims, 16 Drawing Sheets

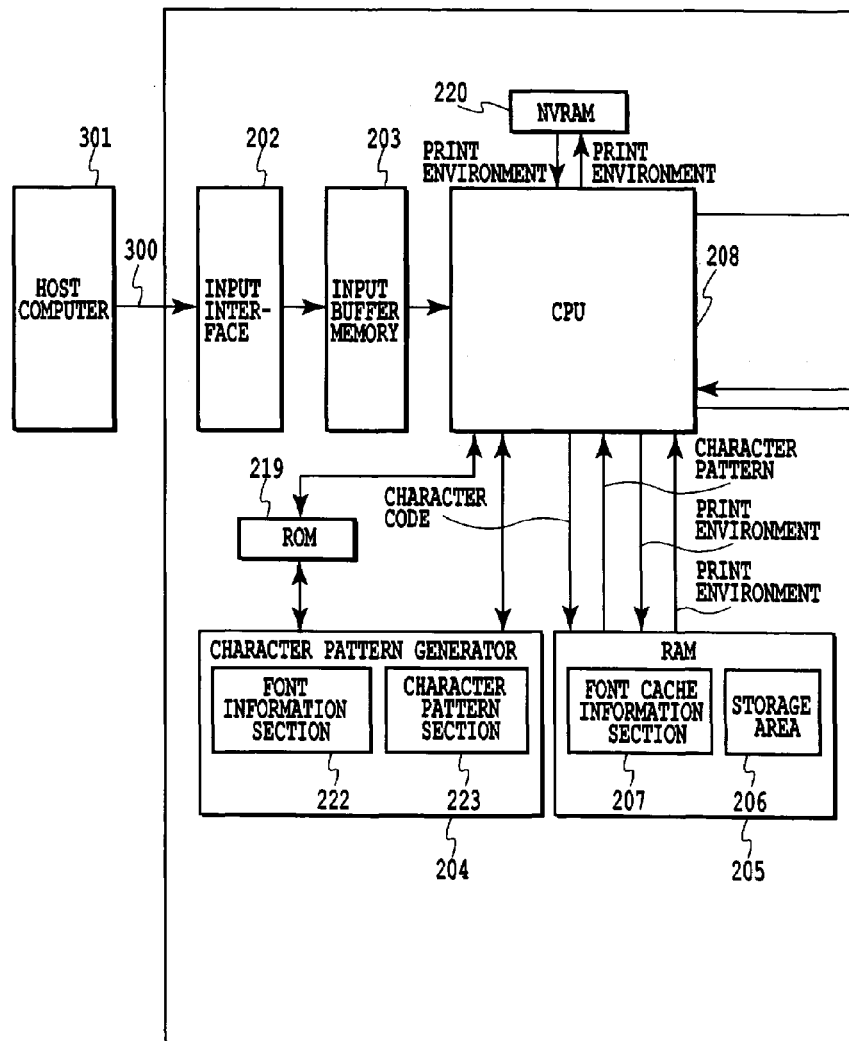

PRINT CONTROL APPARATUS AND PRINT CONTROL METHOD

BACKGROUND OF THE INVENTION

1. Field of the Invention

The present invention relates to a print control apparatus and a print method, and specifically, to a print control apparatus such as a host computer that controls a manner of printing in a printing apparatus such as a printer which carries out printing by switching a combination of the colors of printing materials used for printing such as toners and inks in accordance with an image to be printed. The invention also relates to a print control method for the print control apparatus.

2. Description of the Related Art

With progress in printing apparatuses based on an electrophotographic system or an ink jet system, the level of needs for the results of printing such as a printed image is increasing. As a configuration for meeting the needs, a printer has been proposed which carries out printing by using printing materials for the three primary colors of cyan (C), magenta (M), and yellow (Y) or the four primary colors including the three primary colors and black (K), as well as, print materials for particular colors, for example, red, blue, and green, or gold, silver, and a fluorescent color. A printing apparatus has also been proposed which carries out printing by using the above print materials for the primary colors as well as print materials for, for example, light cyan (LC) and light magenta (LM) which contain thinner coloring matters.

FIGS. 1 to 3 show specific forms of printing apparatuses having increased types of printing materials. All the forms shown in theses figures are printers based on the electrophotographic system. These printers use toners for six colors including C, M, Y, K, LC, and LM, as printing materials. The form shown in FIG. 1 is a printer employing six image carriers (photosensitive members) corresponding to the six toners. The form shown in FIG. 2 is a printer having six developing devices provided around the periphery of one photosensitive member. The form shown in FIG. 3 is a printed described in, for example, Japanese Patent Application Laid-Open No. 4-204871(1992) and employing two photosensitive members each provided with three developing devices around the periphery.

The printer shown in FIG. 1 comprises image forming sections Sa to Sf arranged along a conveyance path of an intermediate transfer belt 5 and having respective photosensitive members 1a to 1f for the corresponding printing materials and respective developing devices 41 to 46 in which the corresponding color toners are filled. This form provides a relatively high print output rate for six color printing and focuses on throughput or productivity.

In contrast, the printer shown in FIG. 2 has one photosensitive member 1 combined with six developing devices 41 to 46. A rotary 4 in which the developing devices 41 to 46 are mounted is rotated to selectively move the developing devices to a position facing to the photosensitive member 1, so that latent images are sequentially developed. Accordingly, with this configuration, a toner image developed as described above is transferred to the intermediate transfer belt 5 for each color, that is, a multi-transfer of the six-color toner image is carried out. The six-toner image formed on the intermediate transfer belt is then transferred to a print sheet. The printing apparatus based on this system provides a lower throughput than the form shown in FIG. 1 but has a relatively small size.

Further, the apparatus shown in FIG. 3 is a form corresponding to a compromise form between the apparatuses shown in FIGS. 1 and 2. Specifically, the apparatus shown in FIG. 3 has a first image forming section Sa including a photosensitive drum 1a and a second image forming section Sb including a photosensitive drum 1b. The image forming sections Sa and Sb are provided with three developing devices 41 to 43 and 44 to 46, respectively.

As described above, there are printing apparatuses using print materials for the four primary colors plus, for example, two print materials for particular colors or those having low depth of coloring matter, that is, a total of six color print materials. Some of these printing apparatuses can carry out printing by switching between a mode using only the print materials for the four primary colors and a mode using all the six color print materials. This is because printing with the four color print materials makes it possible to reduce the use amount of print materials as well as running costs, and particularly because in the configuration in which the rotary provided with the developing devices is sequentially rotated for printing as in the case of the form shown in FIG. 2, the reduced number of developing devices serves to improve the throughput.

Through a user interface such as the one shown in FIG. 4, the type of an image, on which determination as to whether to use the mode using the four color print materials or the mode using all the six print materials is based, is set. FIG. 4 shows a user interface provided by a printer driver in a personal computer. As shown in FIG. 4, setting of "Print Object" in "Print Quality" enables selection of the type of an image, for example, "Document/Table", "DTP", "Graphics", or "Photographic Image". Then, depending on this selection, the 4 color mode or the 6 color mode is specified, for example, as shown below, on the basis of a preset relationship.

Document/Table: 4 colors
DTP: 6 colors
Graphics: 6 colors
CAD: 4 colors
WEB page: 4 colors As is apparent from the above relationship, the mode using the six color print materials is determined for an image that requires a relatively high image quality. The mode using the four color print materials is determined for an image that does not require a very high image quality.

The gradation of an image to be printed may be used as other reference for determining the mode. The mode is determined as described below by selecting, for example, "Panel Priority", "Standard", or "High Gradation" from a dialog for specifying "Gradation" as with the printer driver interface shown in FIG. 5.

"Panel Priority": follows specifications for the standard and high gradation set in the panel of the printer
"Standard": 4 colors
"High Gradation": 6 colors Also in this example, if a high gradation image, which requires a relatively high image quality, is printed, the mode using all the six color print materials is determined, as in the case of the example shown in FIG. 4.

Japanese Patent Application Laid-Open No. 2001-318499 describes a configuration similar to that described above. This document discloses an image forming apparatus that forms an image using a dark color toner and a light color toner. This image forming apparatus switches between a mode using only the dark or light color toner (corresponding to the above 4 color mode) and a mode using both dark and light color toner (corresponding to the above 6 color mode).

However, there is a problem with the printing apparatuses capable of carrying out printing by switching between a mode using a set of predetermined types of print materials and a mode using more types of print materials. That is, in particular, in printing in the mode using more types of print materials as in the case of the 6 color mode, the effects of the mode are not substantially obtained in connection with what is called the contents of "Page Setting" such as the layout of a page to be printed and a scale factor for an image to be printed.

For example, if the layout of the page to be printed is such that a plurality of images are printed within one page (one sheet) or a contraction scale factor is used, the size of each image is reduced. Thus, even though printing is carried out in the mode using more types of print materials as in the case of the 6 color mode, to obtain a high quality image, a user may not easily perceive the high quality when observing the print image. This problem also means that large amounts of print materials are consumed for the results of printing not always perceived as intended, and causes other problem of increasing the running cost relative to the image quality.

Besides the page layout, if for example, stamp printing for "Draft", indicating that the image to be printed is a draft, is set, then in many cases, the image to be printed does not require a high image quality. In this case, if printing is carried out in a mode using more types of print materials as in the case of the 6 color mode, this mode is excessive in terms of the image quality. This also increases the running cost relatively to the image quality.

On the other hand, the image to be printed may be estimated to some degree depending on the setting of the size of a document or paper for printing or the scale factor in "Page Setting". For example, if the setting for "Document Size" in "Page Setting" is "Postcard", it can be estimated that printing with a somewhat high quality is desired when the postcard is printed in full colors. This also applies to the case in which an enlargement scale factor is used.

SUMMARY OF THE INVENTION

An object of the present invention is to provide a print control apparatus and a print control method that operate for a printing apparatus capable of carrying out printing by switching between a mode using a set of predetermined types of print materials and a mode using more types of print materials, to avoid wasting, in particular, the effects of the mode using more types of print materials, in connection with page settings, so as to enable printing suitable for the mode.

In the first aspect of the present invention, there is provided a print control apparatus for a printing apparatus that carries out printing by switching between a first mode using a predetermined number of print materials and a second mode using more print materials than the predetermined number of materials, the print control apparatus comprising:

detection means for detecting the content of a setting other than a setting for a content of an image to be printed, among settings for print; and control means for controlling the print apparatus to carry out printing related to the setting by switching between the first mode and the second mode in accordance with the content of setting detected by the detection means.

In the second aspect of the present invention, there is provided a print control method for a printing apparatus that carries out printing by switching between a first mode using a predetermined number of print materials and a second mode using more print materials than the predetermined number of materials, the print control method comprising the steps of:

detecting the content of a setting other than a setting for a content of an image to be printed, among settings for print; and controlling the print apparatus to carry out printing related to the setting by switching between the first mode and the second mode in accordance with the content of setting detected by the detection means.

With the above configuration, the printing apparatus is controlled to carry out printing by switching between a first mode using a set of a predetermined number of print materials and a second mode using a set of print materials the number of which is larger than the predetermined one, in accordance with the contents of print settings other than those for the contents of the image to be printed. For example, when the image is to be printed so as to be smaller than the original one in accordance with the contents of the print settings other than those for the contents of the image to be printed, such as page layout and the contraction or enlargement of the page, even when the image is printed in the second mode using the larger number of print materials, the user may not perceive the image quality corresponding to the printing in the second mode when observing the results of the printing. In this case, the print control apparatus and method can perform control such that the image is printed in the first mode using the smaller number of print materials. On the other hand, when it is presumed that a user requires high quality of the printed image because the content of print setting is the enlargement of the page, the print control apparatus and method can perform control such that the image is printed in the second mode using a set of print materials the number of which is larger than the predetermined one.

As a result, wasting, in particular, the effects of the mode using more types of print materials can be avoided, and printing suitable for the mode can be carried out, in connection with page settings.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a diagram showing a relation among FIGS. 8A, 8B and 8C, and FIGS. 8A, 8B and 8C are diagrams showing the configuration of a control unit in the printer 100 in detail;

DETAILED DESCRIPTION OF PREFERRED EMBODIMENTS

Embodiments of the present invention will be described below in detail with reference to the drawings.

Figure 6:
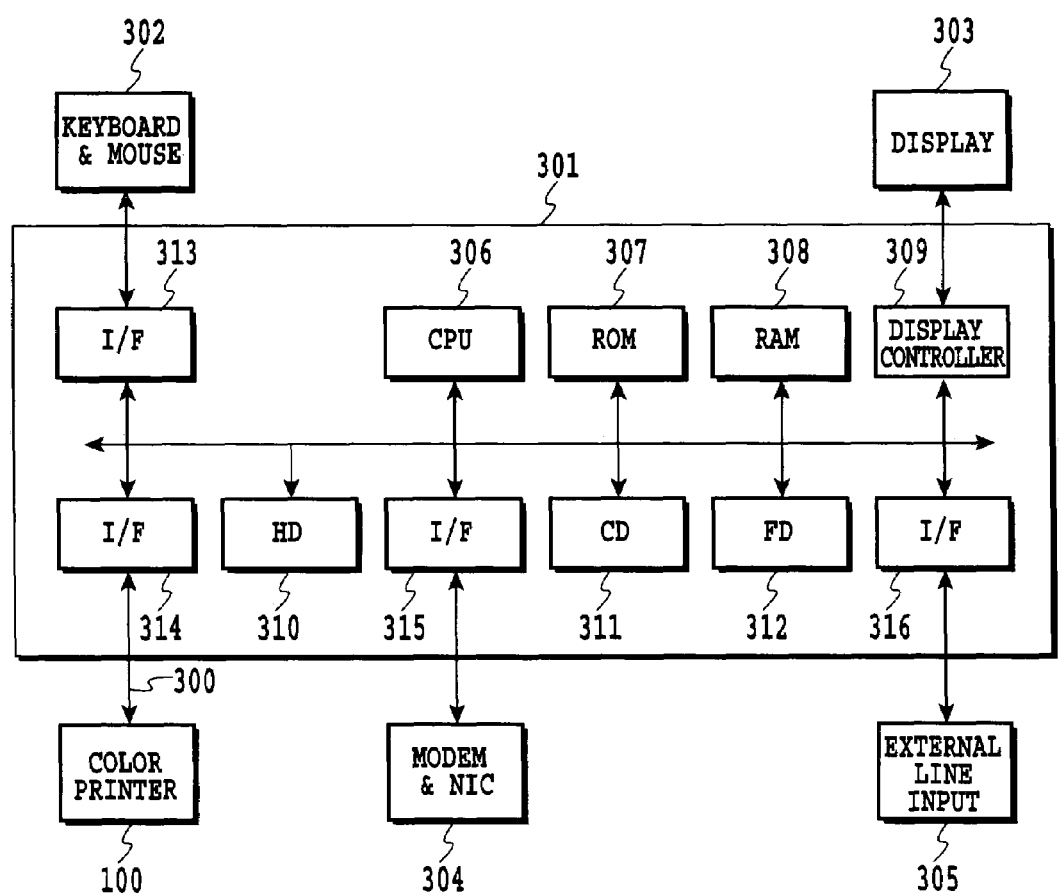
FIG. 6 is a block diagram mainly showing the configuration of a host computer serving as a print control apparatus according to an embodiment of the present invention.

FIG. 6 is a block diagram mainly showing the configuration of a host computer serving as a print control apparatus according to an embodiment of the present invention.

A host computer 301 shown in FIG. 6 executes a control process for printing carried out by a printer 100, which process will be described later with reference to FIGS. 12 to 14. In response to the control process, the printer 100 executes a process described later with reference to FIG. 11 to carry out printing by switching between a mode using 6 color toners and a mode using 4 color toners.

In FIG. 6, reference numeral 306 denotes a CPU that executes the control process and the like in accordance with a program stored in a predetermined memory shown below. Reference numeral 307 denotes a ROM that stores control programs for, form example, processes shown in FIGS. 12 to 14. Reference numeral 308 denotes a RAM which is used as a work area for the processing by the CPU 306 and which temporarily stores a program or data to be processed. Reference numeral 309 denotes a display control device that controls display on a display 303 which shows images to be processed and which shows messages for processing to a user.

Reference numeral 313 denotes an interface (I/F) that transmits data and signals between the computer system 301 and a mouse and keyboard 302 used by the user to input various manual instructions and the like. Reference numeral 314 denotes an interface (I/F) that transmits data and the like between the computer system 301 and the color printer 100 via a network 300.

Reference numeral 310 denotes a hard disk (HD) in which a program or image data to be transferred to the RAM 308 or the like can be stored and to which processed image data is saved. Reference numeral 315 denotes an interface I/F which transmits data between the computer system and transmission equipment 304 such as a modem or network card; the transmission equipment 304 can transmit various data retained in respective areas of the computer system to external equipment and can receive various data from the external equipment. Reference numeral 311 denotes a CD drive which reads data stored in a CD (CD-R/CD-RW/DVD) as an external storage medium, and which writes data in the CD. Reference numeral 312 denotes an FD drive which reads data stored in an FD and which writes data in the FD. If the CD, FD, DVD, or the like stores a program for image edition, printer information, or the like, these programs can be installed on the HD 310 and transferred to the RAM 308 as required. Reference numeral 316 denotes a sound interface (I/F) to which an external line input 305 is connected for inputting sound data.

Figure 7:
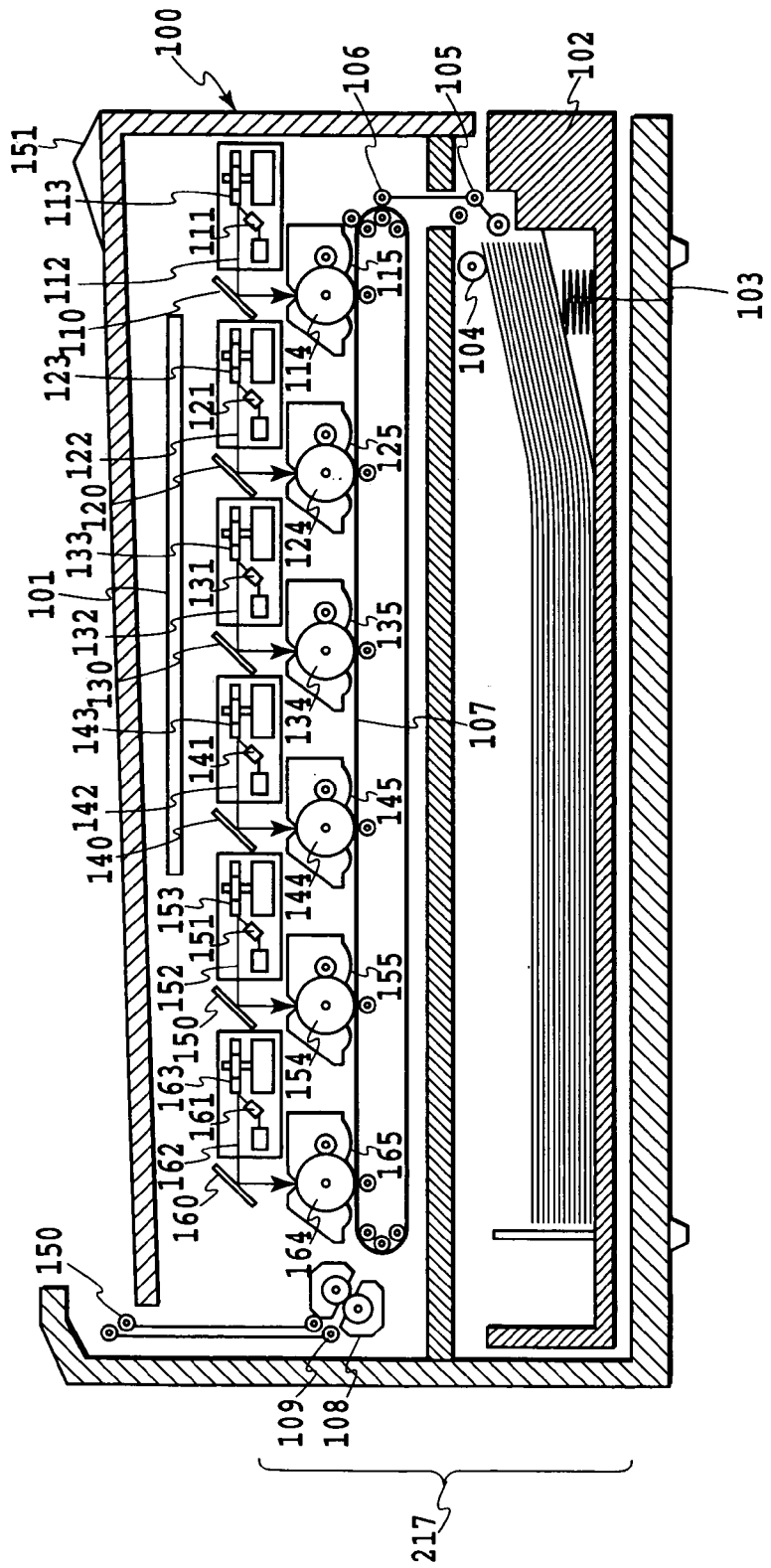
FIG. 7 is a view showing a printer 100 shown in FIG. 6 and from which a case has been removed.

FIG. 7 is a diagram showing the printer 100, shown in FIG. 6, from which a case has been removed. The printer according to the present embodiment is based on an electrophotographic system using laser beams. The printer can carry out printing by switching between a mode using toners for the four primary colors of yellow (Y), magenta (M), cyan (C), and black (K) and a mode using toners for six colors including the four primary colors and light magenta (LM) and light cyan (LC) which have lower depth than the magenta and the cyan have respectively.

For the types of toners used, of course, the application of the present invention is not used to the above combination. As is apparent from the above description, the present invention is applicable to, instead of the 6 color mode, for example, a mode using a set of toners for six or more colors including light magenta, light cyan, and particular colors such as green (G) and red (R), or a 5 or 6 color mode using toners for the particular colors such as green (G) and red (R) instead of light magenta and light cyan. In other words, the present invention is applicable to a combination of toners for the primary colors and a combination of more types of toners.

In FIG. 7, the printer 100 is roughly composed of an operation panel 151, a printer control unit 101, and a printer engine 217.

Figure 8B:
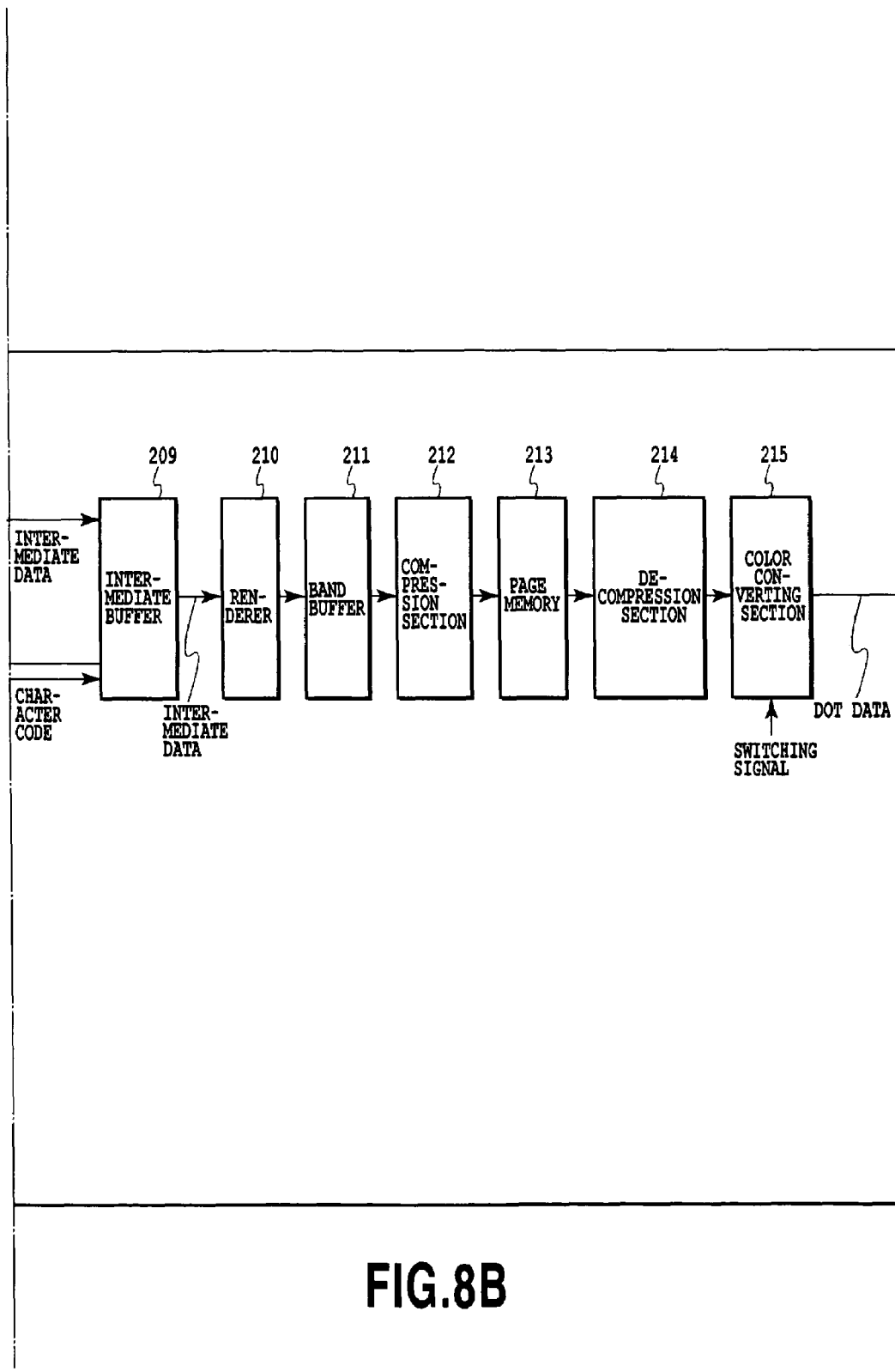
Figure 8C:
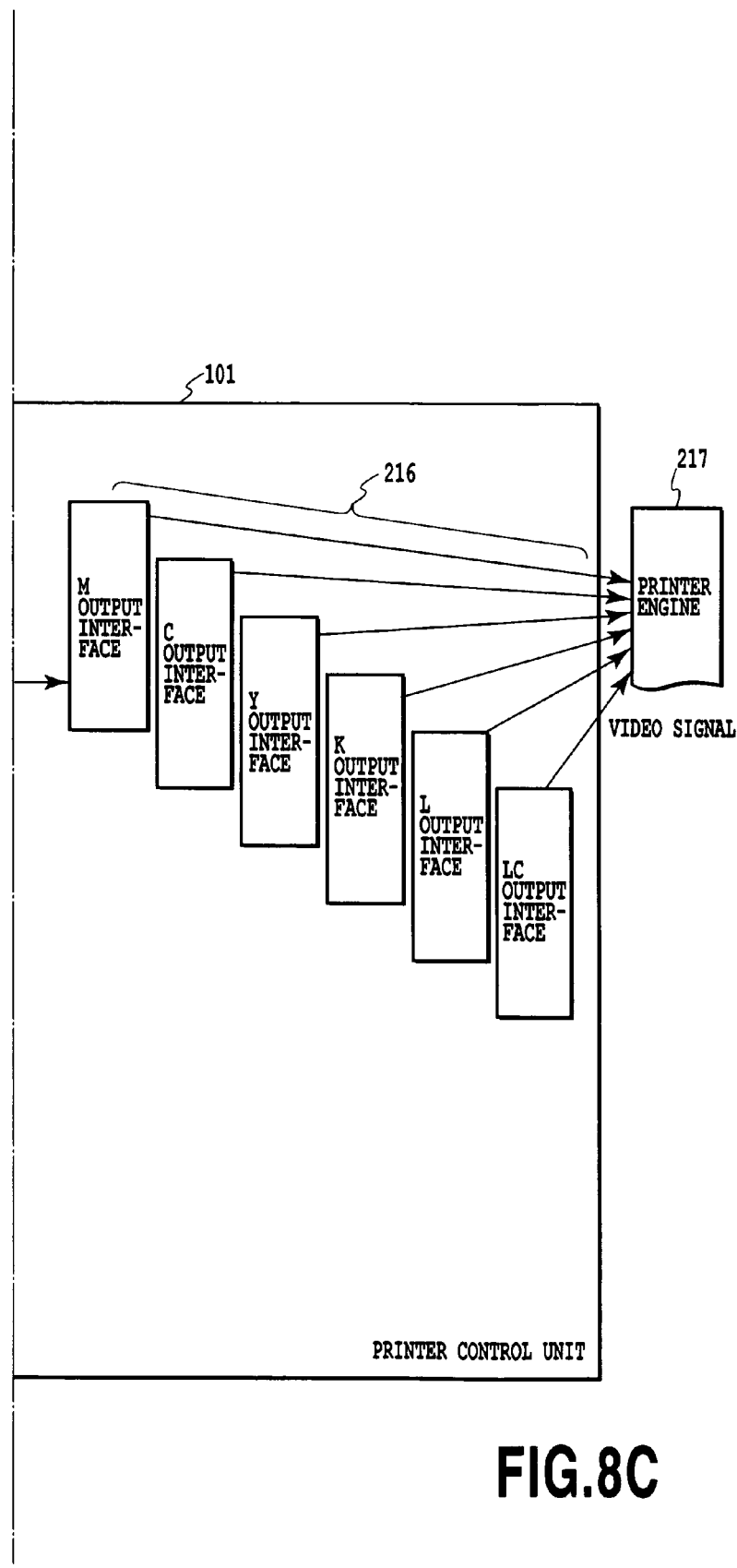

The operation panel 151 is provided with switches used to perform operations for various processes in the printer 100 and a LED and LCD displays that display the state of the printer 100. The printer control unit 101 is formed like a substrate on which various circuits described later in FIG. 8 are formed.

The printer engine 217 can be roughly divided into a sheet conveying mechanism and an image forming mechanism having image forming units for Y, M, LM, C, LC, and K based on the electrophotographic system using laser beams are arranged along a sheet feeding path. In the sheet conveying mechanism, print sheets are pre-housed in a sheet feeding cassette 102. The sheets housed in the cassette are urged upward by a spring 103, and the uppermost sheet is pressed against a feeding roller 104. Thus, as the feeding roller rotates, each sheet can be sequentially separated from the rest and then fed to a feeding path composed of conveying rollers 105 and 106. The conveying rollers 105 and 106 convey the sheet to a conveying belt 107 placed below the image forming mechanism. The print sheet then sequentially passes through the image forming units by the conveying belt 107, so that multiple toner images of M, LM, C, LC, Y, and K are transferred to the print sheet. As the print sheet is conveyed, the toner image transferred to the print sheet is fixed to the print sheet by heat and pressure applied by a fixing device 108. Subsequently, conveying rollers 109 and 150 discharge the print sheet to a sheet discharging section located outside the case.

The image forming units for M, LM, C, LC, Y, and K have the same structure except for the toner used. Description will be given below of the configuration of the image forming unit for magenta (M). The same elements for LM, C, LC, Y, and K as those for magenta described below are denoted by corresponding reference numerals in parentheses. In the magenta image forming unit, a laser driver 110 (120, 130, 140, 150, 160) drives a semiconductor laser element 111 (121, 131, 141, 151, 161) in accordance with a video signal inputted, to turn on/off the output of a laser light 112 (122, 132, 142, 152, 162) from the laser light element 111. The laser light 112 outputted is swung by a rotating polygon mirror 113 in a lateral direction to scan a photosensitive drum 114 (124, 134, 144, 154, 164) and to form an electrostatic latent image of a character, a graphic pattern, an image or the like. The latent image is then developed by a developing unit (toner cartridge) 115 (125, 135, 145, 155, 165) placed around the periphery of the photosensitive drum 114, to form a toner image. The toner image formed is then transferred to the print sheet.

Figure 1:
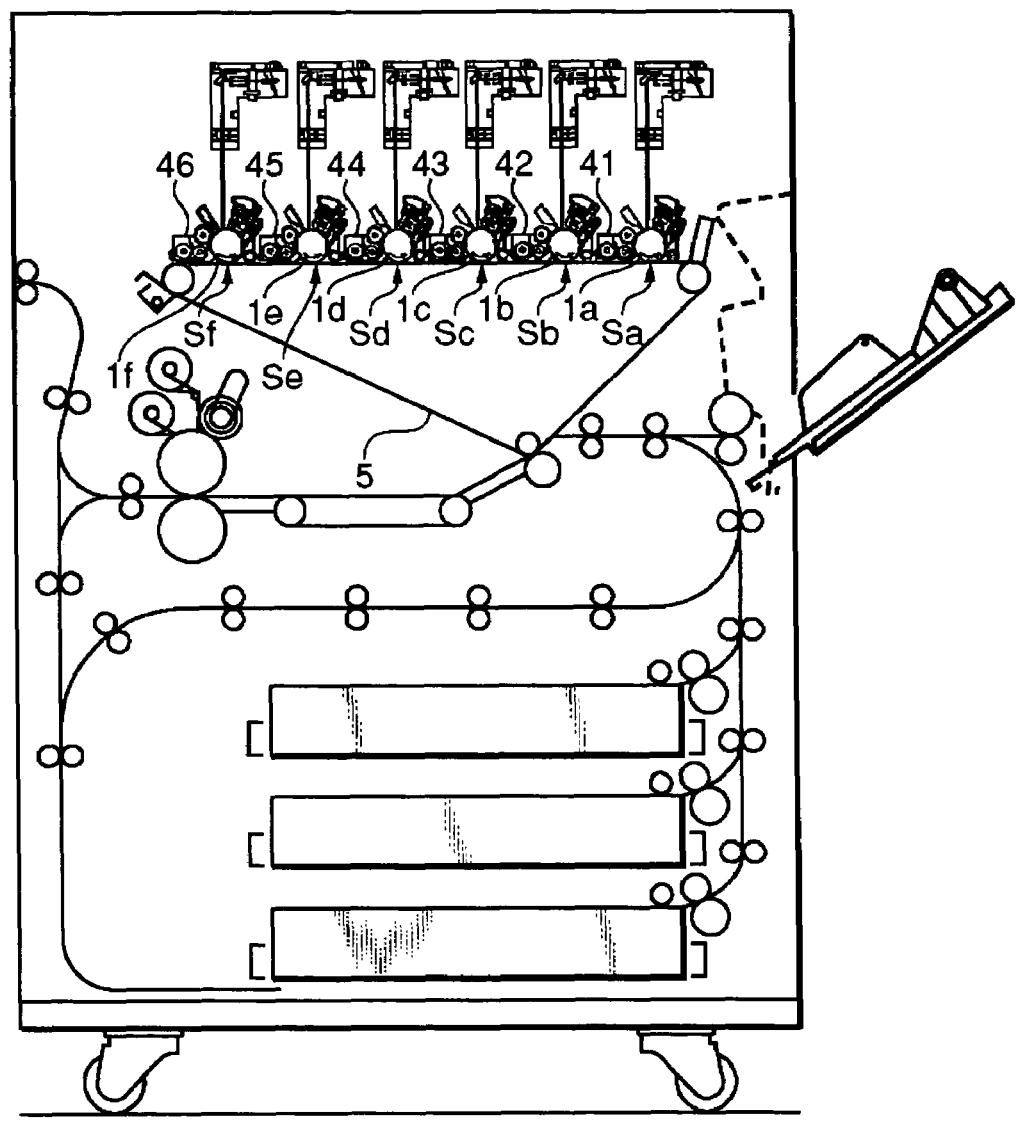
FIG. 1 is a view showing a printer having six image carriers (photosensitive members) corresponding to six colors.
Figure 2:
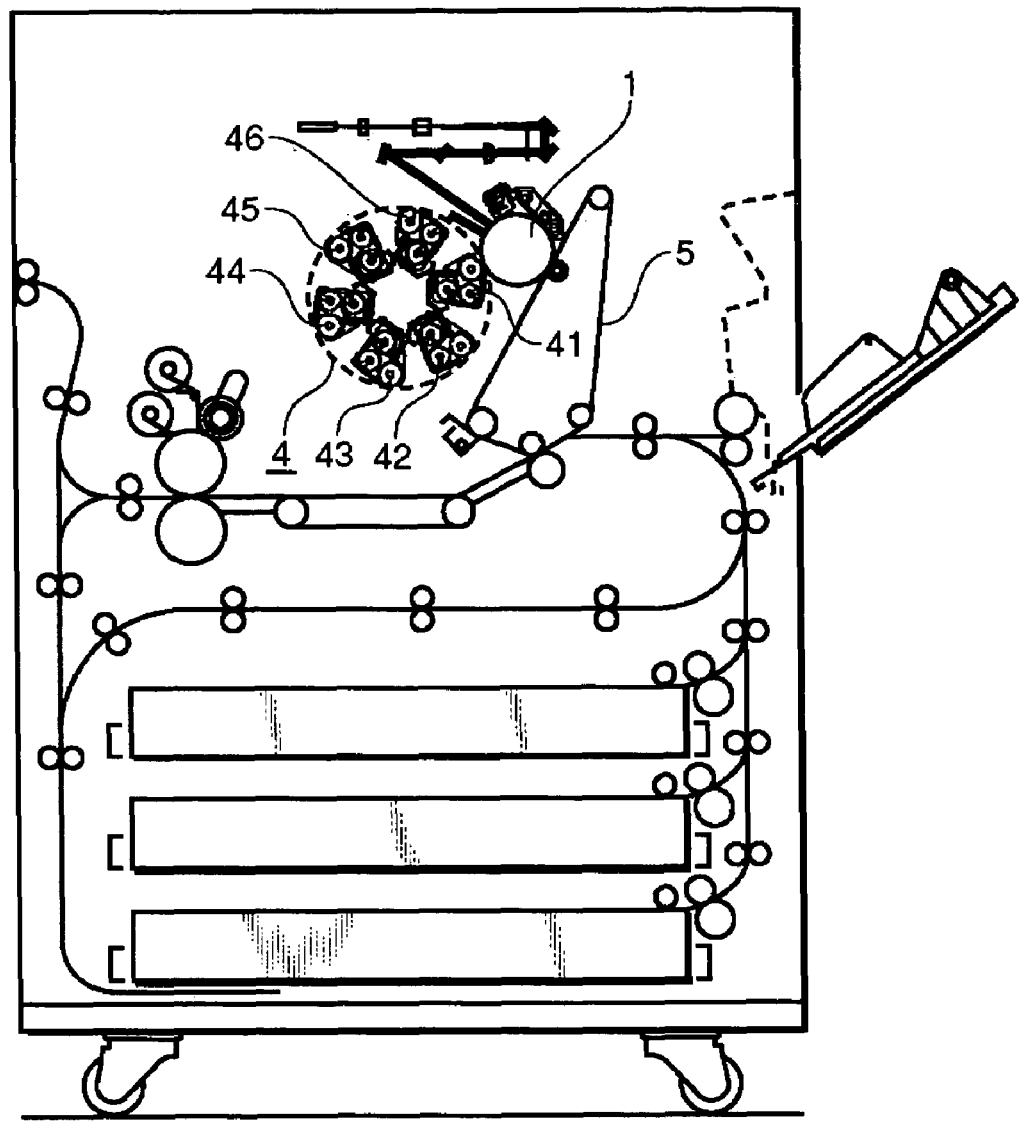
FIG. 2 is a view showing a printer having six developing devices provided in the periphery of one photosensitive member.
Figure 3:
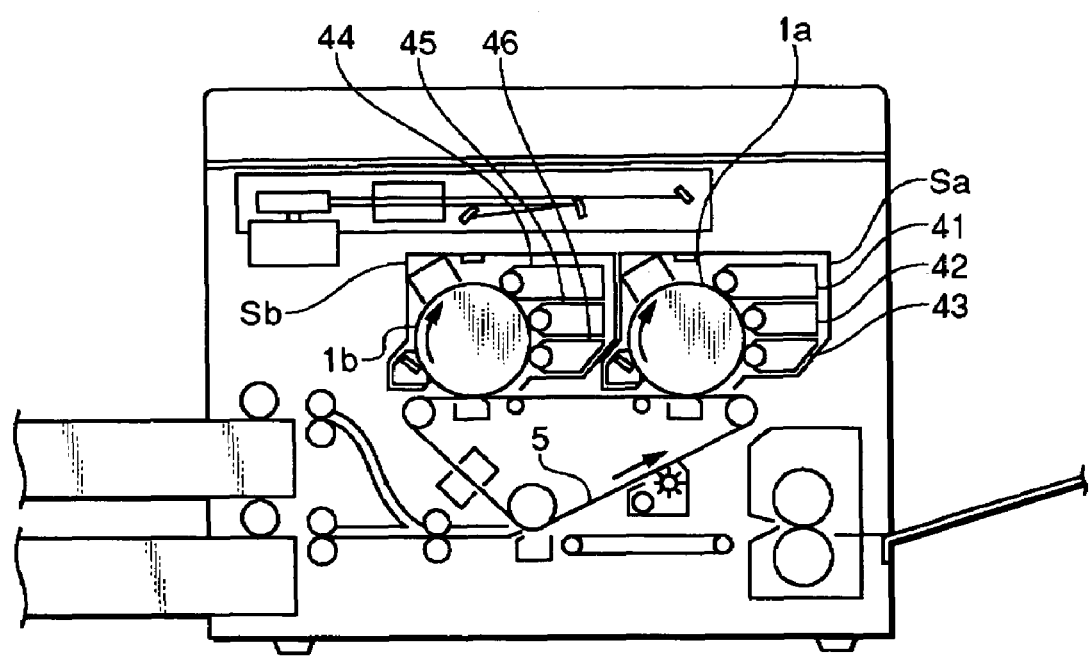
FIG. 3 is a view showing a printer using two photosensitive members and having three developing devices provided in the periphery of each photosensitive member.

Of course, particularly the image forming mechanism in the printer is not limited to the one described above. For example, a mechanism such as the one shown in FIG. 2 or 3 may be used. Here, with the configuration shown in FIG. 3, even an apparatus using toners for five or more colors require only two image forming sections.

FIG. 8 is a block diagram showing the configuration of the control unit in the printer 100 in detail.

In accordance with a character print command, various graphic drawing commands, an image drawing command, and a color specifying command supplied by the host computer 301, the printer 100 performs a printing operation of forming an image of the corresponding character pattern, graphic, or photograph on a print sheet. Specifically, the printer control unit 101 analyzes the command or the like supplied by the host computer 201. The printer control unit 101 then converts R, G, and B color information contained in the command into M, C, Y, and K color information or M, C, Y, K. LM, and LC color information in accordance with the 4 color mode or 6 color mode respectively, set as described later in FIG. 11. The printer control unit 101 then outputs a video signal based on the color information to the printer engine 217.

More specifically, an input interface 202 transmits and receives various information to and from the host computer 301. An input buffer 203 temporarily stores various information inputted via the input interface 202. A character pattern generator 204 is composed of a font information section 222 that stores attributes such as the widths and heights of characters and the addresses of character patterns, a character pattern section 223 that stores the character patterns, and a control program that reads these pieces of information. The read control program is stored in a ROM 219. The control program has a code convert function to calculate the address of a character pattern corresponding to a character code inputted.

A RAM 205 is used as a work area for, for example, a process described later in FIG. 11. In addition to this, the RAM 205 has a font cache area 207 that stores character patterns outputted by the character pattern generator 204, and a storage area 206 that stores external fonts, form information, and the current print environment transmitted by the host computer 301. Since information expanded into a character pattern is stored in the font cache area 207, the same character pattern need not be expanded when required later. This reduces the time required to acquire character patterns.

A CPU 208 executes processes for the whole printer 100, such as one described later in FIG. 11, in accordance with control programs stored in the ROM 219

An intermediate buffer 209 stores a group of internal data generated on the basis of data read from the input buffer 203. In other words, once all data 218 for one page of information to be printed has been received from the host apparatus 301, the CPU 208 converts the data into more simple intermediate data. The intermediate data is then stored in the intermediate buffer 209. A renderer 210 then renders every several lines of intermediate data. The resulting data is stored in a band buffer 211 as a print image. The renderer 210 can generate every several lines of 8-bit/pixel drawing bit map image for each of R, G, and B. At the same time, the renderer 210 can generate a 4-bit/pixel attribute bit map image. The attribute bit map image is composed of 3-bit/pixel information indicating whether each pixel constitutes a character or a graphic or an image and 1-bit/pixel information indicating whether printing involves only K or a mixture of Y, M, C, and K when R=G=B. The band buffer 211 can store at least eight lines of RGB drawing bit map image and attribute bit map image. A compression section 212 reads every several lines of image from the band buffer 211 and then compresses the read image. The compression section 212 then stores the compressed image in a memory 213. The drawing bit map image and the attribute bit map image are separately compressed. Once the intermediate data for one page has been rendered and the image rendered has been stored in a page memory 213, a decompression section 214 reads and decompresses every several lines of the compressed image. The drawing bit map image and the attribute bit map image are separately read to be decompressed.

A color converting section 215 executes color conversion on R, G, and B of bit map image data in accordance with the 4 color mode or 6 color mode, described later in FIG. 11, into the four colors Y, M, C, and K or the six colors Y, M, C, K, LM, and LC of bit map image with 4 bits/pixels for each color. More specifically, a bit map image with 8 bits/pixels for each of R, G, and B is converted into 10 bits/pixels for each of Y, M, C, and K or Y, M, C, K, LM, and LC. The bit map image with 10 bits/pixels for each color is subjected to gamma correction. A half-toning process is then executed on the bit map image subjected to the gamma correction to obtain a bit map image with 4 bits/pixels for each of Y, M, C, K, LM, and LC. The color converting section 215 switches the color converting method depending on the pixel value of the attribute bit map image. Specifically, the color converting section 215 switches the color converting method on the basis of 1-bit/pixel information indicating whether or to print the image only in K or in a mixture of Y, M, C, and K or Y, M, C, K, LM, and LC. The color converting section 215 thus converts the bit map image with 8 bits/pixels for each color into 10 bits/pixels for each color. Then, the color converting section 215 switches the half-toning process on the basis of 3-bit/pixel information indicating whether each pixel constitutes a character or a graphic or an image. The color converting section 215 thus converts the bit map image with 10 bits/pixels for each color into 4 bits/pixels for each color.

Figure 11:
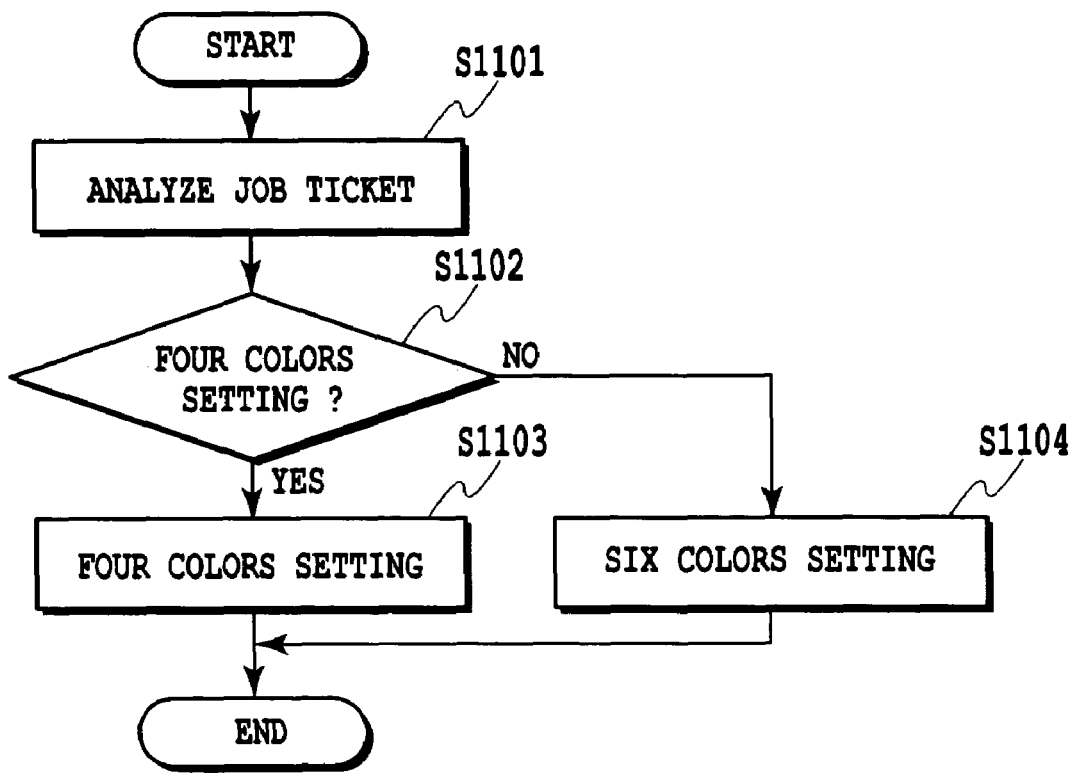
FIG. 11 is a flow chart showing a process executed by a control unit 101 of the printer 100 to switch between the 4 color mode and the 6 color mode.

The switching by the color converting section 215 in accordance with the 4 or 6 color mode is carried out by a switching signal outputted on the basis of a setting process shown in FIG. 11. In the present embodiment, a circuit configuration such as an LUT used is switched to output a bit map image for the four colors Y, M, C, and K or the six colors Y, M, C, K, LM, and LM as data converted.

Figure 9:
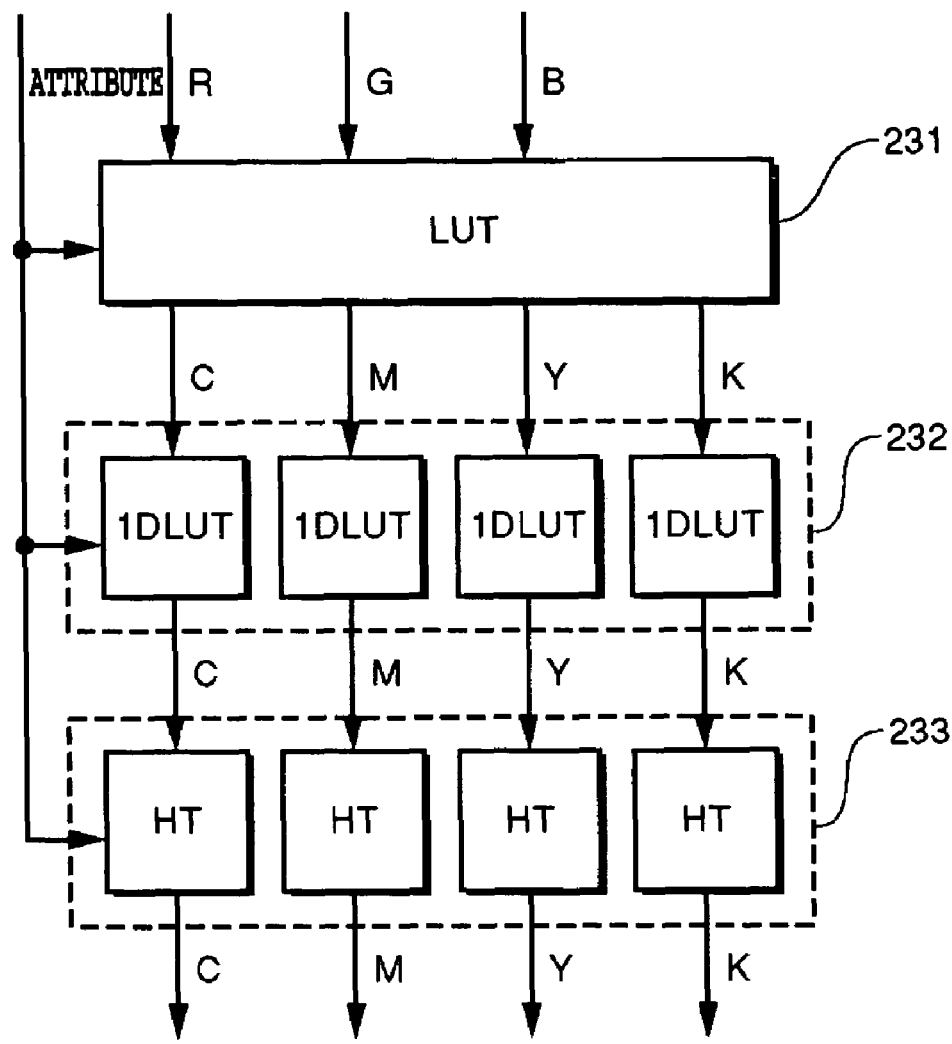
FIG. 9 is a block diagram showing the circuit configuration of a color converting section 215 for a 4 color mode.
Figure 10:
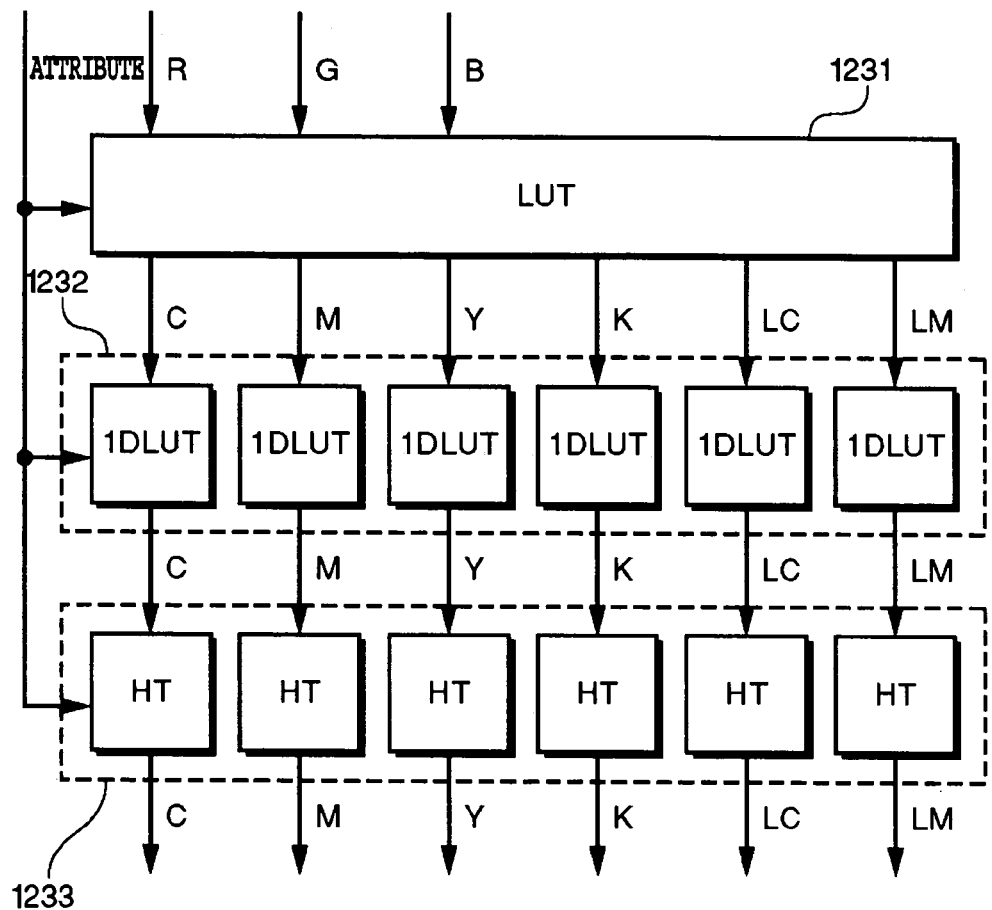
FIG. 10 is a block diagram showing the circuit configuration of the color converting section 215 for a 6 color mode.

FIG. 9 is a block diagram showing the circuit configuration of the color converting section 215 for the 4 color mode. FIG. 10 is a block diagram showing the circuit configuration of the color converting section 215 for a 6 color mode.

As shown in FIG. 9, the 4 color mode color converting section 215 has a lookup table (LUT) 231 with three inputs and four outputs for color conversions, an LUT 232 with one input and one output for gamma corrections, and an LUT (HT) 233 for a half-toning process. Each pixel of an R, G, and B bit map image is sequentially inputted to the 4 color mode color converting section 215. The 4 color mode color converting section 215 then outputs a Y, M, C, and K bit map image. These LUTs can further be switched in accordance with the pixel value of the attribute bit map image. There are two types of LUT 231, three types of LUT 232 for each of C, M, Y, and K, and three types of HT 233 for each of C, M, Y, and K.

In contrast to the 4 color mode configuration, as shown in FIG. 10, the color converting section 215 for the 6 color mode is composed by having a lookup table (LUT) 1231 with three inputs and six outputs for color conversions, an LUT 1232 with one input and one output for gamma corrections, and an LUT (HT) 1233 for a half-toning process. As in the case of the 4 color mode, on the basis of each pixel of an R, G, and B bit map image sequentially inputted, the 6 color mode color converting section 215 outputs a CMYK, LC, and LM bit map image. As in the case of the 4 color mode, these LUTs can further be switched in accordance with the pixel value of the attribute bit map image.

Reference is made to FIG. 8 again. The output interface 216 converts a bit map image inputted from the color converting section 215 into a video signal to output the video signal to the printer engine 217. More specifically, the output interface 216 is composed of six interfaces for M, C, Y, K, LM, and LC. The interfaces independently acquire a bit map image from the color converting section 215. The interfaces then converts the bit map image into a video signal and then outputs the signal to the laser drivers 110, 120, 130, 140, 150 and 160 for respective color planes. Of course, in the 4 color mode, video signals for LM and LC are not outputted.

Further, a nonvolatile memory 220 (hereinafter referred to as NVRAM (Non Volatile RAM)) composed of an EEPROM stores information set via the operation panel (panel set values).

An engine synchronizing memory (not shown) is provided between the color converting section 215 and the output interface 216. This enables the retention of one page of bit map image for Y, M, C, and K or Y, M, C, K, LC, and LM outputted by the color converting section 215.

FIG. 11 is a flow chart showing a process executed by the control unit 101 of the printer 100 to switch between the 4 color mode and the 6 color mode.

In FIG. 11, first, a job ticket is analyzed which is attached to a print job sent by the host computer 301. A job specifying section is then analyzed to determine whether to carry out printing in the 4 color mode or the 6 color mode. Specifically, as described later with reference to FIG. 12 and the subsequent figures, the host computer 301 sets the job specifying section of the job ticket in accordance with the contents of page settings for printing set via the user interface. The control unit 101 determines as to whether the 4 color mode or the 6 color mode in accordance with the content of the setting for the job specifying section.

In a step S1102, on the basis of the results of the analysis in the step S1101, when the 4 color mode is specified, the process proceeds to a step S1103. Then, the printer 100 is set for the 4 color mode by setting the switching signal shown in FIG. 8 for the 4 color mode to allow the processing circuit shown in FIG. 9 to execute a relevant process. On the other hand, when the 6 color mode is specified, the process proceeds to a step S1104. Then, the printer 100 is set for the 6 color mode by setting the switching signal shown in FIG. 8 for the 6 color mode to allow the processing circuit shown in FIG. 10 to execute a relevant process.

Figure 12:
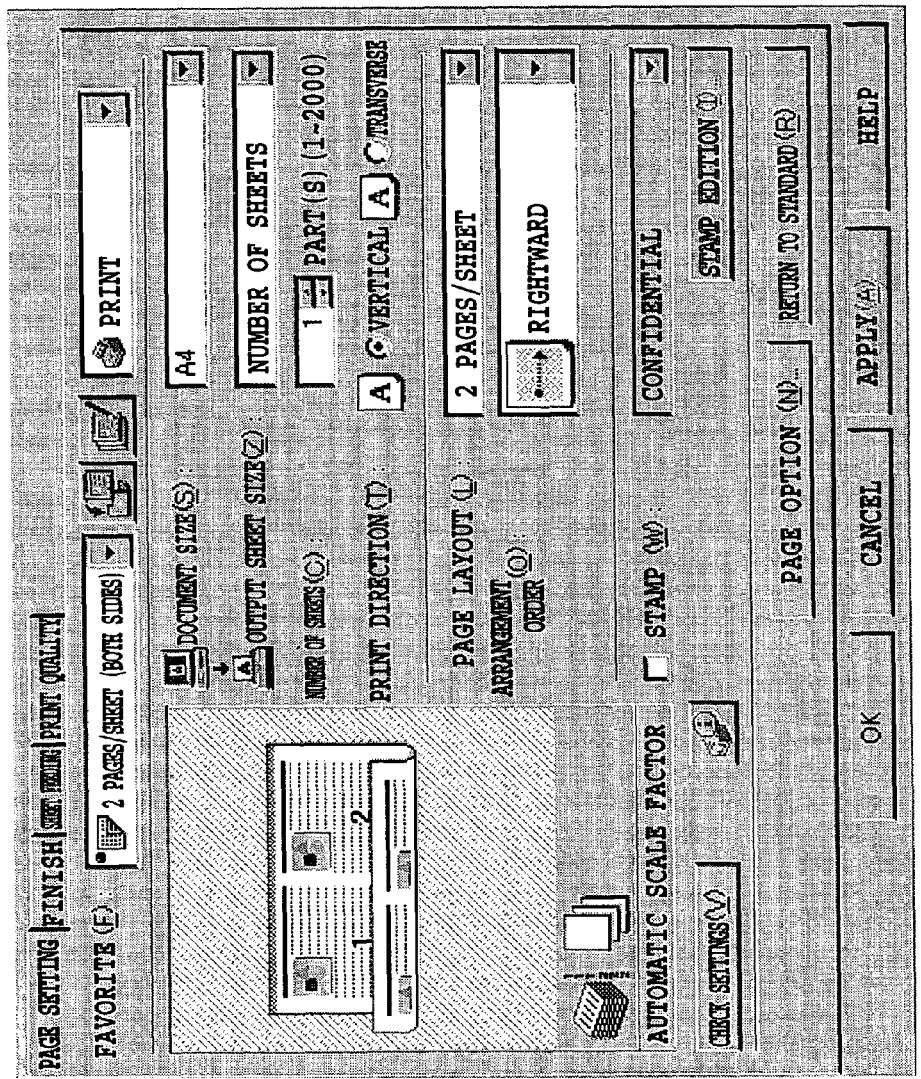
FIG. 12 a view showing an interface for "Page Setting" included in the user interfaces provided by the printer driver in a host computer 301.

FIG. 12 is a diagram showing an interface for "Page Setting" included in the user interfaces provided by the printer driver in the host computer 301. When making settings for printing, a user operates on a display of a "Print Object" dialog box in a "Print Quality" user interface shown in FIG. 4 to set the type of image to be printed, that is, a document/table, DTP, or graphic, as well as operates on a display of a "Page Setting" screen shown in FIG. 12 to set a document size, an output sheet size, a page layout, a scale factor, a stamp, and the like. In accordance with this "Page Setting", 4 or 6 color mode printing is carried out as shown in several embodiments below.

Embodiment 1

Figure 13:
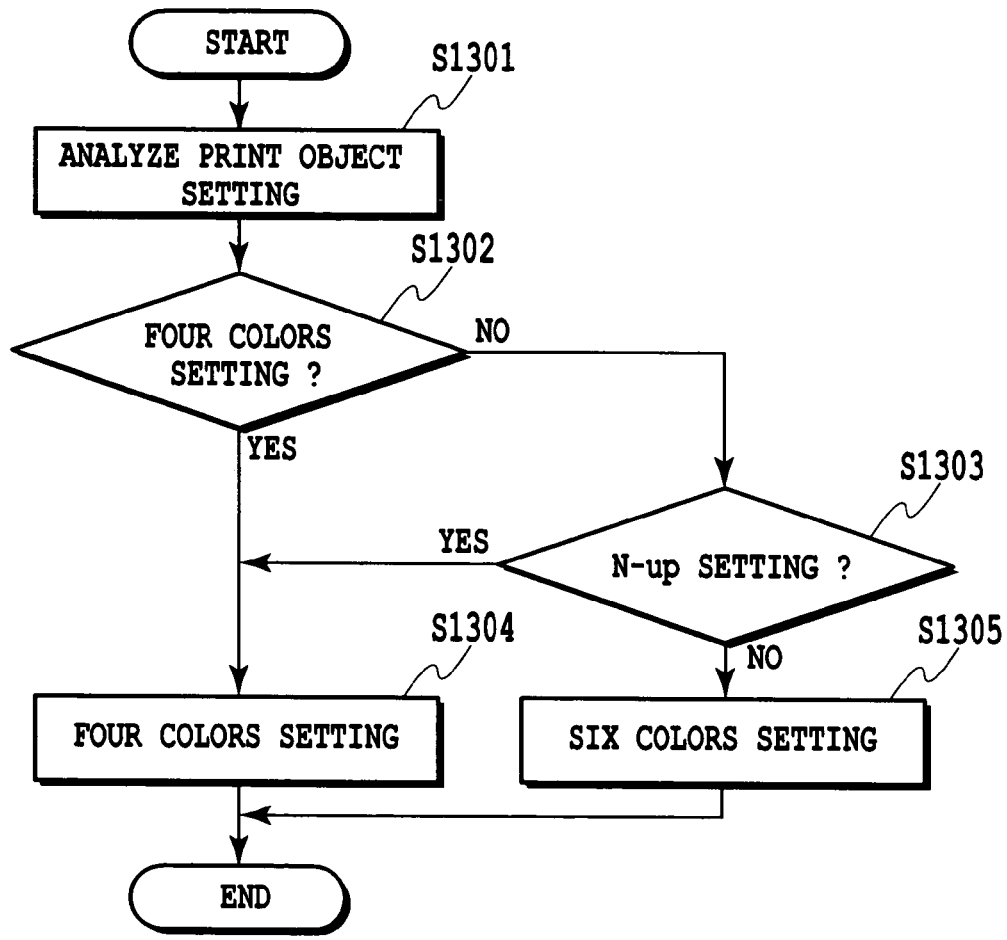
FIG. 13 is a flow chart showing a process executed by the printer driver in the host computer 301 to set a 4 color mode specification and a 6 color mode specification according to a first embodiment of the present invention.

FIG. 13 is a flow chart showing a process executed by the printer driver in the host computer 301 to set a 4 color mode specification and a 6 color mode specification according to a first embodiment of the present invention. As has been described previously, this setting process sets the contents of a job specifying section of a job ticket in a print job transmitted to the printer 100. Specifically, in the present embodiment, when in the "Page Setting", the page layout is set to print a plurality of images per one page, the contents of the job ticket are set to carry out printing in the 4 color mode.

Figure 4:
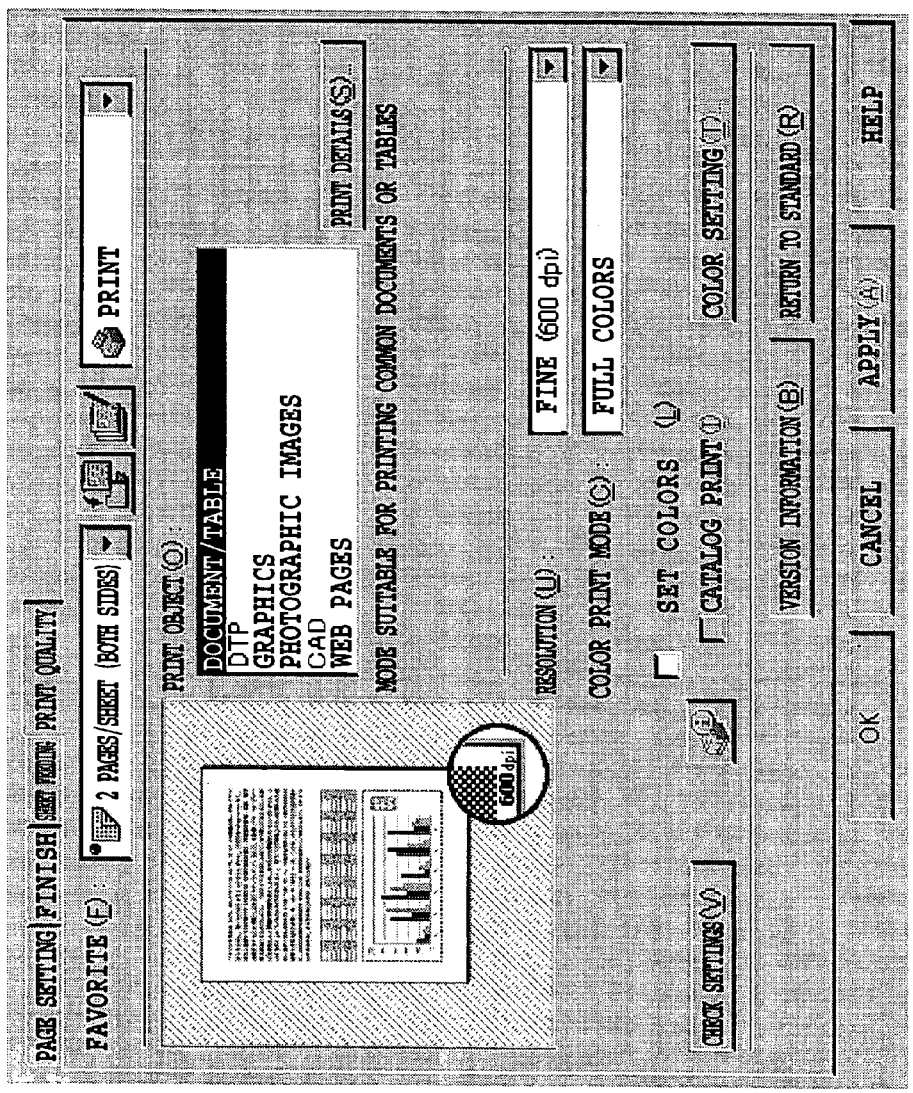
FIG. 4 is a view showing a user interface for "Print Quality" provided by a printer driver in a personal computer.
Figure 5:
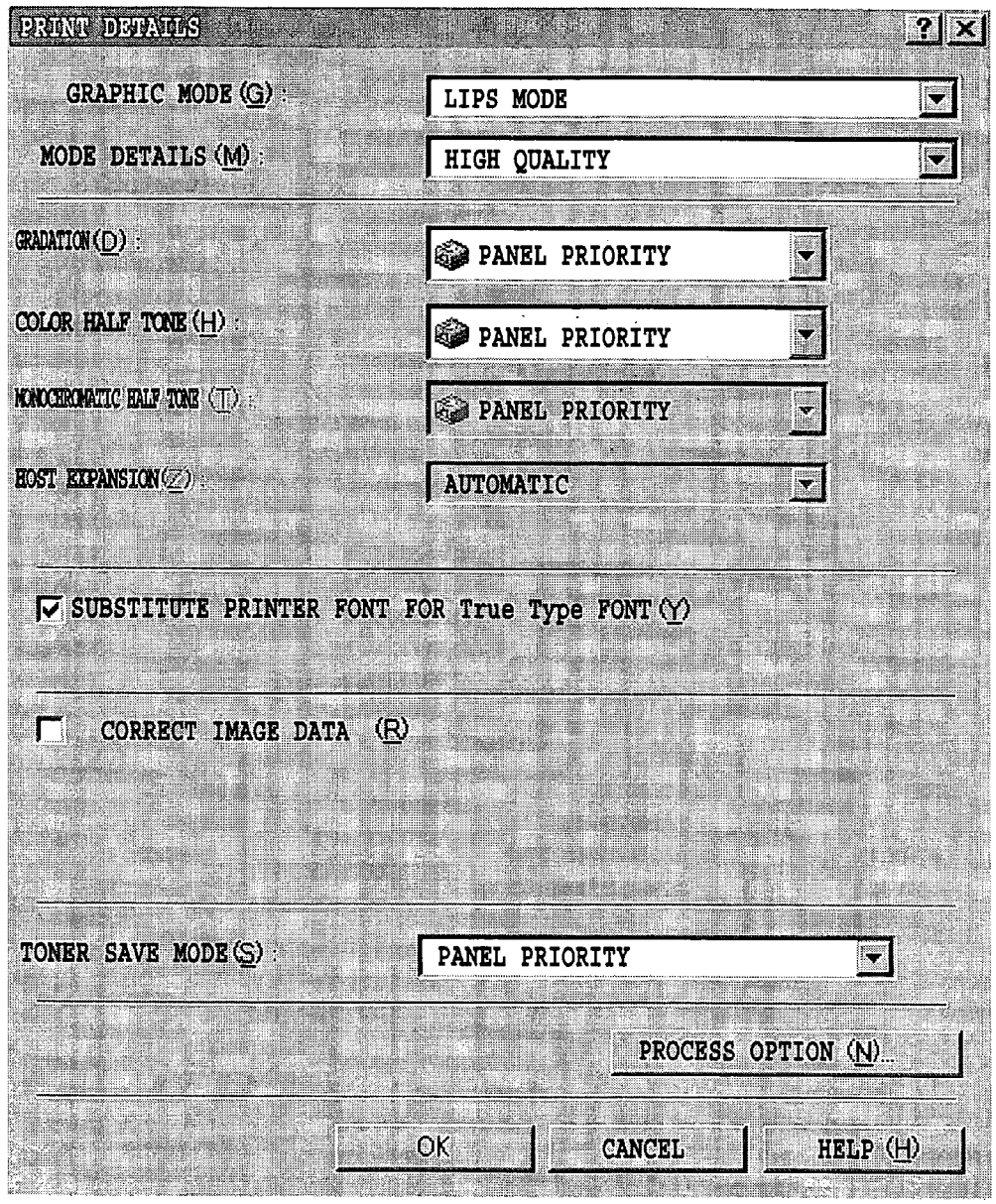
FIG. 5 is a view showing settings for the print details of a print object in the "Print Quality" in the user interface of the printer driver.

In FIG. 13, in a step S1301, the set value for each "Print Object" is checked which has been inputted by the user via the interface shown in FIG. 4. Then, in a step S1302, it is determined whether each print object is set for the 4 color mode or the 6 color mode, on the basis of correspondences shown below.

Document/Table: 4 colors
DTP: 6 colors
Graphics: 6 colors
Photographic Images: 6 colors
CAD: 4 colors
WEB page: 4 colors If in the step S1302, the setting is determined to correspond to the 4 color mode, the process proceeds to a step S1304. If the setting is determined to correspond to the 6 color mode, the process proceeds to a step S1303.

In the step S1303, it is determined whether or not, of the "Page Layout" set items shown in FIG. 12, the page layout is set for one page unit/page or N (N>1) page units/page. If the page layout is set for one page unit/page, the process proceeds to a step S1305. If the page layout is set for N (N>1) page units/page, the process proceeds to the step S1304. Then, in the step S1304, printing is determined to be carried out in the 4 color mode to set the print specification in the job ticket for the 4 color mode. On the other hand, in the step S1305, printing is determined to be carried out in the 6 color mode to set the print specification in the job ticket for the 6 color mode.

In this manner, if a plurality of page units are printed within one page, each page unit is contracted when printed. Accordingly, it is often difficult to perceive the printed image quality when observing the image. Thus, in the present embodiment, if the page layout is such that a plurality of page units are printed within one page, even if the 6 color mode is set, printing is controlled to be carried out in the 4 color mode. This makes it possible to prevent the amount of print materials consumed for the results of printing not perceived as intended from become large. It is thus possible to suppress an increase in running costs relative to the image quality.

In the above example, in the step S1303, the determination is based on one page unit/page or N (N>1) page units/page. However, a different threshold such as 2 page units/page or N (N>2) page units/page may be used for the determination in accordance with the degree that the image quality can be perceived.

Embodiment 2

A second embodiment of the present invention relates to a process of setting the 4 color mode or the 6 color mode depending on whether the "Scale Factor" set in the "Page Setting" interface shown in FIG. 12 is contraction.

More specifically, in the step S1303 shown in FIG. 13, it is determined whether or not the scale factor set in the interface is for contraction. If the scale factor is 100%, the process proceeds to the step S1305 to set the 6 color mode. On the other hand, if the scale factor is less than 100% for contraction, the process proceeds to the step S1304 to set the 4 color mode.

As in the case of the first embodiment, if the scale factor is less than 100% for contraction, that page is contracted when printed. Accordingly, it is often difficult to perceive the printed image quality when observing the image. Thus, in the present embodiment, if the scale factor is less than 100%, even if the 6 color mode is set, printing is controlled to be carried out in the 4 color mode.

In the above example, the determination is based on whether or not the scale factor is less than 100%. However, a different threshold may be defined as a criterion in accordance with the degree that the image quality can be perceived. For example, the determination is based on whether or not the scale factor is less than 50%.

Embodiment 3

A third embodiment of the present invention relates to a process of setting the 4 color mode or the 6 color mode depending on the contents of the "Stamp" printing set in the "Page Setting" interface.

More specifically, in the step S1303 shown in FIG. 13, it is determined whether or not the type of "Stamp" set in the "Page Setting" interface in FIG. 12 is "Draft". If the type of "Stamp" is different from the draft, the process proceeds to the step S1305 to set the 6 color mode. On the other hand, if the type of stamp is the draft, the process proceeds to the step S1304 to set the 4 color mode.

Thus, if the printed image does not require a high image quality, when printing is carried out in a mode using more types of print materials as in the case of the 6 color mode, this mode is excessive in terms of the image quality. Thus in the present embodiment, even if the 6 color mode has already been set, the 4 color mode is set to suppress unwanted consumption of toners.

In the above example, the determination is based on whether or not the type of stamp is the draft. However, when a stamp is printed, it is printed so as to partly overlap an image to be printed. Consequently, the original image to be printed may be impaired to some degree. Thus, when for example, a stamp is set to be printed, the 4 color mode may be set regardless of its type. Alternatively, the 4 color mode may be set when a stamp type is set such as one that corresponds to printing that does not require a very high image quality as in the case of the "draft".

Embodiment 4

Figure 14:
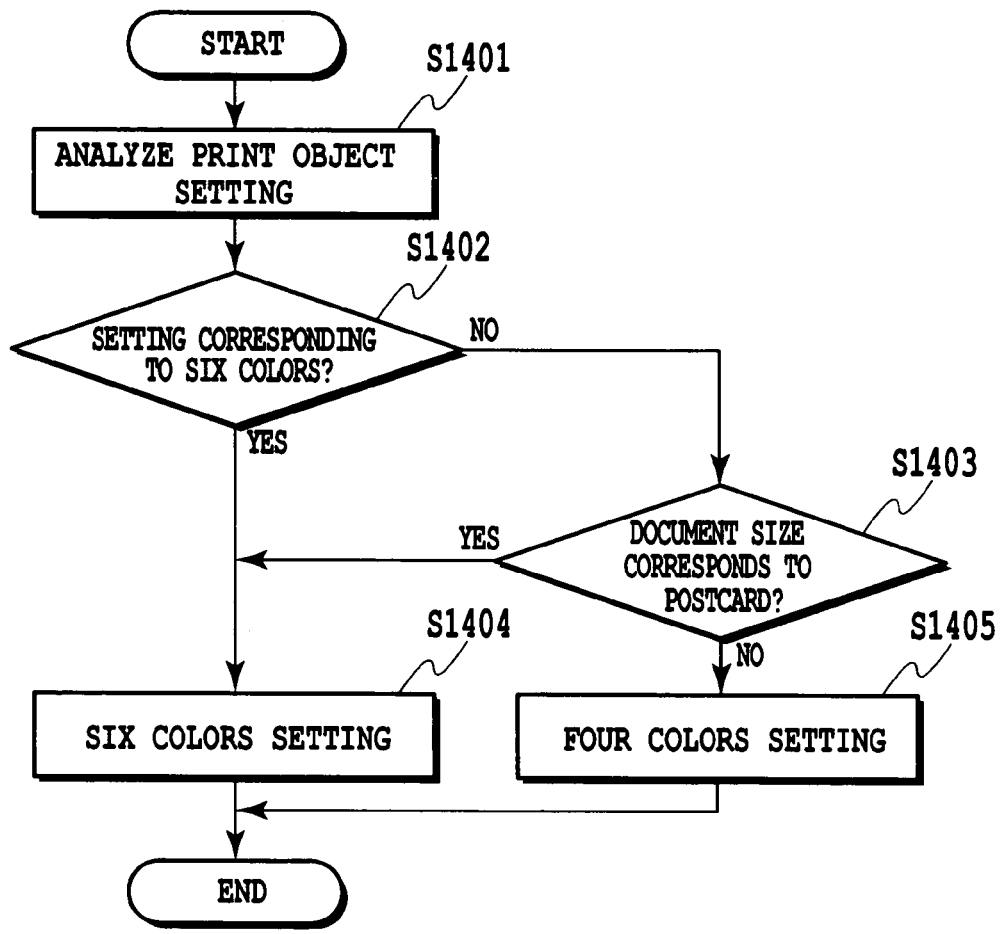
FIG. 14 is a flow chart showing a process executed by the printer driver in the host computer 301 to set a 4 color mode specification and a 6 color mode specification according to a fourth embodiment of the present invention.

FIG. 14 is a flow chart showing a process executed by the printer driver in the host computer 301 to set a 4 color mode specification and a 6 color mode specification according to a fourth embodiment of the present invention. As in the process shown in FIG. 13, this setting process sets the contents of the job specifying section of the job ticket in the print job transmitted to the printer 100.

In a step S1401, the set value for each print object is checked. In a step S1402, it is determined whether each print object is set for the 4 color mode or the 6 color mode, on the basis of the correspondences shown below.

Document/Table: 4 colors
DTP: 6 colors
Graphics: 6 colors
Photographic Images: 6 colors
CAD: 4 colors
WEB page: 4 colors The processing in the steps S1401 and S1402 is similar to the processing in the steps S1301 and S1302, shown in FIG. 13. When it is determined in the step S1402 that the setting corresponds to the 6 color mode, the process proceeds to a step S1404 to set the 6 color mode.

On the other hand, when the setting corresponds to the 4 color mode, the process proceeds to a step S1403 to determine whether the "Document Size" set in the "Page Setting" in FIG. 12 corresponds to a postcard. When it is determined that the setting does not correspond to the postcard, the process proceeds to a step 1405 to determine that a 4 color output be provided. The print specification in the job ticket is thus set for the four colors. On the other hand, when the document size corresponds to the postcard, the process proceeds to the step S1404 in spite of the 4 color setting. It is then determined that a 6 color output be provided to set the print specification in the job ticket for the six colors.

In this manner, if a document of a postcard size is printed, a high quality is often desired. Accordingly, printing is carried out in the 6 color mode. This makes it possible to utilize the contents of page settings to reliably carry out printing suitable for the 6 color mode.

The above example utilizes the postcard size. However, the user may predetermine a particular size for determination so that determination can be made on the basis of whether or not this size has been set.

Embodiment 5

In the fourth embodiment, the 4 color mode and the 6 color mode are switched on the basis of the document size. On the other hand, in a fifth embodiment of the present invention, the modes are switched in accordance with the setting in "Output Sheet Size" in the "Page Setting" interface. When the size of the output sheet corresponds to a postcard, printing is carried out in the 6 color mode because a high image quality is often desired.

More specifically, in the step S1403 in FIG. 14, it is determined whether or not the output sheet size set in the "Page Setting" interface in FIG. 12 corresponds to a postcard. If the output sheet size does not correspond to the postcard, the process proceeds to the step S1405 to set the 4 color mode. On the other hand, if the output sheet size is determined to correspond to the postcard, the process proceeds to the step S1404 to switch the setting for the 4 color mode to the 6 color mode.

Embodiment 6

A sixth embodiment of the present invention relates to a process of switching between the 4 color mode and the 6 color mode depending on whether or not enlargement printing is carried out.

In the step S1403 in FIG. 14, it is determined whether or not "Scale Factor" is set for enlargement, that is, the scale factor is larger than 100%, in the "page Setting" interface, shown in FIG. 12. If the scale factor is not set for enlargement, the process proceeds to the step S1405 to set the 4 color mode. If the scale factor is set for enlargement, the process proceeds to the step S1404 to set the 6 color mode.

In the present embodiment, as in the case of the above fourth and fifth embodiments, if the "Scale Factor" is set for enlargement, the 6 color mode is set because a high image quality is often desired.

Of course, the threshold for the scale factor is not limited to 100% as in the above second embodiment. A larger threshold may be used as a criterion in accordance with the degree of a high image quality accomplished by enlargement and the associated level of desire.

Embodiment 7

A seventh embodiment of the present invention relates to a combination of the above first to sixth embodiments.

For example, in connection with a combination of the above determination criteria, corresponding to the above various settings in the "Page Setting", the 4 color mode or the 6 color mode may be set when anyone of the determination criteria is met in the step S1303 in FIG. 13 or in the step S1403 in FIG. 14. In connection with another form of combination, the 4 color mode or the 6 color mode may be set when a plurality of determination criteria in the "Page Setting" are simultaneously met; for example, only when in the step. S1303 in FIG. 13, the page layout is set for N page units/one page and the stamp printing of a draft is set, the 4 color mode is set.

The use of an alternative combination is as follows. All the determination criteria are referenced, and priorities are predetermined so that for example, the top priority is given to the determination based on the setting for the page layout or to the determination based on the setting for the scale factor.

Embodiment 8

An eighth embodiment of the present invention relates to a switch in the process of switching between the 4 color mode and the 6 color mode in connection with accounting, that is, a charge for printing.

For example, the printer driver in the host computer 301 references accounting tables (cost tables) for the 4 and 6 color modes to charge each job in accordance with the tables. If a charge for printing of one sheet varies between the 4 color mode and the 6 color mode, the determination in the step S1303 in FIG. 13 of each of the first to third embodiments or the eighth embodiment is made. If the same charge is used, the determination in the step S1303 need not be made. This accommodates users who know that switching the 6 color mode to the 4 color mode produces the effects described in the respective embodiments but who desire to use the 6 color mode if its charge is the same as that for the 4 color mode.

The user may input the accounting tables. Alternatively, the accounting tables may be retained in the control unit of the printer so as to be uploaded by the printer driver.

Other Embodiments

The above embodiments, switch between the set of the four primary colors Y, M, C, and K and the set of the six colors including the four primary colors and LM and LC. However, the present invention is not limited to such a combination as is apparent from the above description. Specifically, the present invention is applicable to any combination of print materials to be switched provided that one of the set has more types of print materials than the other and that higher quality printing can be carried out by using the set including more types of print materials. An example of a combination of more types of print materials is a combination of, for example, six colors including two particular colors ,green (G) and red (G), or eight colors including green (G) and red (R) in addition to LM and LC. Of course, the print materials are not limited to toners, which are used in the above embodiments. Clearly, the present invention is applicable to a printing apparatus using, for example, inks as print materials.

In the above embodiments, as a precondition for the determination based on the various settings in the "Print Setting" in the step S1303 in FIG. 13 and in the step S1403 in FIG. 14, the 4 color mode or the 6 color mode is preset in accordance with the settings in the "Print Quality", shown in FIG. 14. However, it is unnecessary to set the 4 color mode or the 6 color mode as such a precondition. The 4 color mode or the 6 color mode may be set on the basis of the determination based on the various settings in the "Print Setting" in the step S1303 in FIG. 13 and in the step S1403 in FIG. 14.

Further Embodiments

An embodiment is also included in the category of the present invention, wherein program codes of software such as those shown in FIGS. 13 and 14, for example, which realize the above described embodiments, are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a nonvolatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2003-409650 filed Dec. 8, 2003, which is hereby incorporated by reference herein.

What is claimed is:

1. An image processing method comprising the steps of:
  setting information on a combination of print materials used when outputting an input image on a sheet, based on page setting information of the input image; and
  selectively changing the information set in said setting step, said changing step including the sub-steps of:
    determining whether to change the information set in said setting step, based on different page setting information from the page setting information; and
    changing the information set in said setting step when it is determined in said determining sub-step to change the information, and not changing the information set in said setting step when it is determined in said determining sub-step not to change the information,
  wherein there are a combination of a larger number of print materials and a combination of a smaller number of print materials as combinations of print materials usable for outputting the input image on the sheet, and
  wherein, in the case that the information on the combination of print materials used when outputting the input image on the sheet is the combination of the larger number of print materials, and the page setting information of the input image includes page setting information indicating that the input image of a page layout, having a greater number of page units than a predetermined number that is equal to or greater than 1, is outputted on one page of the sheet, it is determined in said determining sub-step to change the combination used when outputting the input image on the sheet into the combination of the smaller number of print materials.

2. An image processing method comprising the steps of:
  setting information on a combination of print materials used when outputting an input image on a sheet, based on page setting information of the input image; and
  selectively changing the information set in said setting step, said changing step including the sub-steps of:
    determining whether to change the information set in said setting step, based on different page setting information from the page setting information; and
    changing the information set in said setting step when it is determined in said determining sub-step to change the information, and not changing the information set in said setting step when it is determined in said determining sub-step not to change the information,
  wherein there are a combination of a larger number of print materials and a combination of a smaller number of print materials as combinations of print materials usable for outputting the input image on the sheet, and
  wherein, in the case that the information on the combination of print materials used when outputting the input image on the sheet is the combination of the larger number of print materials, and the page setting information of the input image includes page setting information indicating that the input image, which has been varied at a smaller magnification ratio than a predetermined magnification ratio that is smaller than 1, is outputted on the sheet, it is determined in said determining sub-step to change the combination used when outputting the input image on the sheet into the combination of the smaller number of print materials.

3. An image processing method comprising the steps of:
  setting information on a combination of print materials used when outputting an input image on a sheet, based on page setting information of the input image; and
  selectively changing the information set in said setting step, said changing step including the sub-steps of:
    determining whether to change the information set in said setting step, based on different page setting information from the page setting information; and
    changing the information set in said setting step when it is determined in said determining sub-step to change the information, and not changing the information set in said setting step when it is determined in said determining sub-step not to change the information,
  wherein there are a combination of a larger number of print materials and a combination of a smaller number of print materials as combinations of print materials usable for outputting the input image on the sheet, and
  wherein, in the case that the information on the combination of print materials used when outputting the input image on the sheet is the combination of the larger number of print materials, and the page setting information of the input image includes page setting information indicating that the input image, overlapped with a stamp, is outputted on the sheet, it is determined in said determining sub-step to change the combination used when outputting the input image on the sheet into the combination of the smaller number of print materials.

4. An image processing method comprising the steps of:
  setting information on a combination of print materials used when outputting an input image on a sheet, based on page setting information of the input image; and
  selectively changing the information set in said setting step, said changing step including the sub-steps of:
    determining whether to change the information set in said setting step, based on different page setting information from the page setting information; and
    changing the information set in said setting step when it is determined in said determining sub-step to change the information, and not changing the information set in said setting step when it is determined in said determining sub-step not to change the information,
  wherein there are a combination of a larger number of print materials and a combination of a smaller number of print materials as combinations of print materials usable for outputting the input image on the sheet, and
  wherein, in the case that the information on the combination of print materials used when outputting the input image on the sheet is the combination of the larger number of print materials, and the page setting information of the input image includes page setting information indicating that the input image, overlapped with a predetermined kind of stamp, is outputted on the sheet, it is determined in said determining sub-step to change the combination used when outputting the input image on the sheet into the combination of the smaller number of print materials.

5. An image processing method comprising the steps of:
setting information on a combination of print materials used when outputting an input image on a sheet, based on page setting information of the input image; and
selectively changing the information set in said setting step, said changing step including the sub-steps of:
  determining whether to change the information set in said setting step, based on different page setting information from the page setting information; and
  changing the information set in said setting step when it is determined in said determining sub-step to change the information, and not changing the information set in said setting step when it is determined in said determining sub-step not to change the information,
wherein there are a combination of a larger number of print materials and a combination of a smaller number of print materials as combinations of print materials usable for outputting the input image on the sheet, and
wherein, in the case that the information on the combination of print materials used when outputting the input image on the sheet is the combination of the larger number of print materials, and the page setting information of the input image includes page setting information indicating that the input image, which has been varied at a magnification ratio equal to or greater than a predetermined magnification ratio that is greater than 1, is outputted on the sheet, it is determined in said determining sub-step to change the combination used when outputting the input image on the sheet into the combination of the larger number of print materials.

* * * * *

UNITED STATES PATENT AND TRADEMARK OFFICE
CERTIFICATE OF CORRECTION

PATENT NO. : 7,384,205 B2
APPLICATION NO. : 11/000190
DATED : June 10, 2008
INVENTOR(S) : Joji Oki It is certified that error appears in the above-identified patent and that said Letters Patent is hereby corrected as shown below:

COLUMN 1:
Line 41, "punted" should read --printer--.

COLUMN 5:
Line 42, "form" should read --for--.

COLUMN 7:
Line 34, "K." should read --K,--.
Line 69, "ROM 219" should read --ROM 219.--.

COLUMN 8:
Line 8, "of" should read --of an--.

COLUMN 9:
Line 33, "converts" should read --convert--.
Line 34, "outputs" should read --output--.
Line 59, "in" should read --is in--.

COLUMN 13:
Line 19, "red (G)," should read --red (R),--; and
"gre" should read --green--.
Line 19, "en (G)" should read --(G)--.
Line 32, "anyone" should read --any one--.
Line 38, "step." should read --step--.

COLUMN 14:
Line 44, "above described" should read --above-described--.
Line 49, "above described" should read --above-described--.
Line 59, "above described" should read --above-described--.

UNITED STATES PATENT AND TRADEMARK OFFICE
CERTIFICATE OF CORRECTION

PATENT NO. : 7,384,205 B2
APPLICATION NO. : 11/000190
DATED : June 10, 2008
INVENTOR(S) : Joji Oki It is certified that error appears in the above-identified patent and that said Letters Patent is hereby corrected as shown below:

<u>COLUMN 15</u>:
Line 6, "above described" should read --above-described--.

Signed and Sealed this

Thirty-first Day of March, 2009

JOHN DOLL
*Acting Director of the United States Patent and Trademark Office*